(12) United States Patent
Vaughan et al.

(10) Patent No.: US 8,254,572 B2
(45) Date of Patent: Aug. 28, 2012

(54) SECURE PROVISIONING OF A PORTABLE DEVICE USING A REPRESENTATION OF A KEY

(75) Inventors: Greg Vaughan, Santa Cruz, CA (US);
Kazu Yanagihara, Cupertino, CA (US);
Eric Zelenka, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 858 days.

(21) Appl. No.: 12/242,489

(22) Filed: Sep. 30, 2008

(65) Prior Publication Data
US 2010/0080383 A1    Apr. 1, 2010

(51) Int. Cl.
*H04L 9/00* (2006.01)
(52) U.S. Cl. .......................................... 380/44
(58) Field of Classification Search ...................... 380/44
See application file for complete search history.

(56) References Cited

U.S. PATENT DOCUMENTS

| 6,886,750 B2 | 5/2005 | Rathus et al. |
| 7,287,696 B2 | 10/2007 | Attia et al. |
| 2002/0147390 A1* | 10/2002 | Markis et al. ................. 600/301 |
| 2006/0161779 A1* | 7/2006 | Geoffrey ........................ 713/176 |
| 2008/0162937 A1* | 7/2008 | Kohlenberg et al. .......... 713/171 |
| 2010/0211506 A1* | 8/2010 | Chang et al. .................... 705/65 |

OTHER PUBLICATIONS

Saxena, N. et al., "Secure Device Pairing Based on a Visual Channel," 2006 IEEE Symposium on Security and Privacy, May 21-24, 2006, seventeen pages, Oakland, California, USA.

* cited by examiner

*Primary Examiner* — Jacob Lipman
(74) *Attorney, Agent, or Firm* — Fenwick & West LLP

(57) ABSTRACT

A portable device initially accesses a secure server and requests a certificate. The secure server generates a random key and encodes the generated key to generate a representation of the key, such as a two-dimensional bar code or an audio signal, and communicated to a local device, such as a laptop or desktop computer, using a web interface. The local device is used to present the representation of the key to a mobile device. The mobile device then captures the representation of the key from the local device, for example using an image capture device or audio capture device, and extracts the key by decoding the representation of the key. The key is then stored by the mobile device and used to securely communicate with the secure server without manually entering the key.

21 Claims, 4 Drawing Sheets

SECURE PROVISIONING OF A PORTABLE DEVICE USING A REPRESENTATION OF A KEY

BACKGROUND

1. Field of Art

The present invention generally relates to managing communication between devices, and more specifically, to provisioning a portable device for secure communication.

2. Description of the Related Art

Portable devices such as smartphones, cellular phones, and personal digital assistants (PDA) are becoming more powerful and functional devices. This has caused increasing reliance on portable devices as a primary method of communication. For example, many users routinely use portable devices to monitor electronic mail, manage appointments, maintain a contact list, maintain a task list or perform numerous other activities. Because of the portability of mobile computing devices, they allow users to rapidly modify and access information from various locations.

To perform many of these tasks, portable devices need to connect to one or more servers, such as a mail server, to transmit and receive data. However, many of these servers are secured by firewalls, proxy servers or other mechanisms that limit access to the server to selected portable devices. For example, only users employed by a certain company are able to access the company's mail server or other servers.

Many servers use either a shared secret or a signed certificate to regulate the ability of portable devices to access the server. If a shared secret is used, the secret should be unique to each client and include a large random key for security. Alternatively the server can create a signed certificate for each portable device that is used to access the server along with a private key associated with the signed certificate. However, the server must securely communicate the private key to the portable device to prevent other devices from intercepting the key and being able to use the associated certificate to access the server. One way to communicate the certificate and associated private key is by using a temporary key to encrypt data communication between server and portable device.

In any of those cases, the portable device must have access to some initial key before gaining access to the server. Conventionally, many servers generate a random key that is used to encrypt a communication channel between the server and the portable device. The certificate or trusted certificate is then communicated form server to portable device using the encrypted channel. However, both the server and the portable device must locally store the key to encrypt the channel, so the key needs to be communicated from server to portable device before being used to encrypt the channel. Conventionally, the portable device must be physically connected to the server using a network cable, USB connection or other physical connector so the key can be transmitted to the portable device without being intercepted or modified. Alternatively, a portable device user must manually enter the key, which is often a long string of data, such as an alphanumeric or a numeric string. These conventional methods either require the portable device to be in close physical proximity to the server to be physically connected or require a user to manually input a long string of data, making key entry cumbersome and subject to errors caused by incorrect data entry.

SUMMARY

The present invention allows provisioning of a portable device for communication with a secure server by communicating a representation of a key to the portable device. The portable device extracts the key from the representation of the key for use to communicate with the secure server.

The secure server generates a key responsive to receiving a request from a portable device for certification to communicate with the secure server. A representation of the key, such as a two-dimensional barcode or an audio signal, is then generated by the secure server. A web interface is used to communicate the representation of the key to a local device which is provisioned to communicate with the secure server. For example, the local device is a desktop or laptop connected to the secure server behind a firewall. The local device communicates the representation of the key to the portable device. For example, the local device displays a bar code representing the key or plays an audio file representing the key. The portable device then captures the representation of the key and extracts the key from the representation of the key. In one embodiment, the portable device includes an image capture device that captures the two-dimensional barcode representing the key displayed by the local device. In another embodiment, the portable device includes an audio capture device that records the audio file representing the key played by the local device.

In one embodiment, a secure server initially receives a request from a user to provision a portable device for communication with the secure server. The secure server generates a key associated with the requesting user. In one embodiment, the key is a fixed length string, such as an alphanumeric string, generated responsive to a provisioning request and is valid for a predefined time interval. The secure server then generates a representation of the key which is communicated to a local device that has previously been provisioned. In one embodiment, the representation of the key includes the generated key; account data, such as username and password, associated with the requesting user; and an address of a proxy server for use by the portable device to communicate with the secure server. The representation of the key may take various forms, such as a two-dimensional barcode or an audio signal, allowing the user to store the key onto the portable device without manually entering the key and additional information. Additionally, the representation of the key allows the portable device to be provisioned without directly communicating with the secure server.

The portable device captures a representation of a key from a local device that has previously been provisioned to communicate with a secure server. The representation of the key is associated with a key generated by the secure server and associated with a user requesting provisioning of the portable device to communicate with the secure server. In one embodiment, the representation of the key includes the key generated by the secure server and associated with the user requesting portable device provisioning, user account information, such as username and password, and a proxy server identifier. The proxy server allows the portable device to access the secure server from remote locations. To simplify configuration of the portable device, the local device presents the representation of the key in a format allowing the representation of the key to be simply captured by the portable device. The portable device then extracts the key by decoding the representation of the key and locally stores the key.

The features and advantages described in the specification are not all inclusive and, in particular, many additional features and advantages will be apparent to one of ordinary skill in the art in view of the drawings, specification, and claims. Moreover, the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

System Architecture

Figure 1:
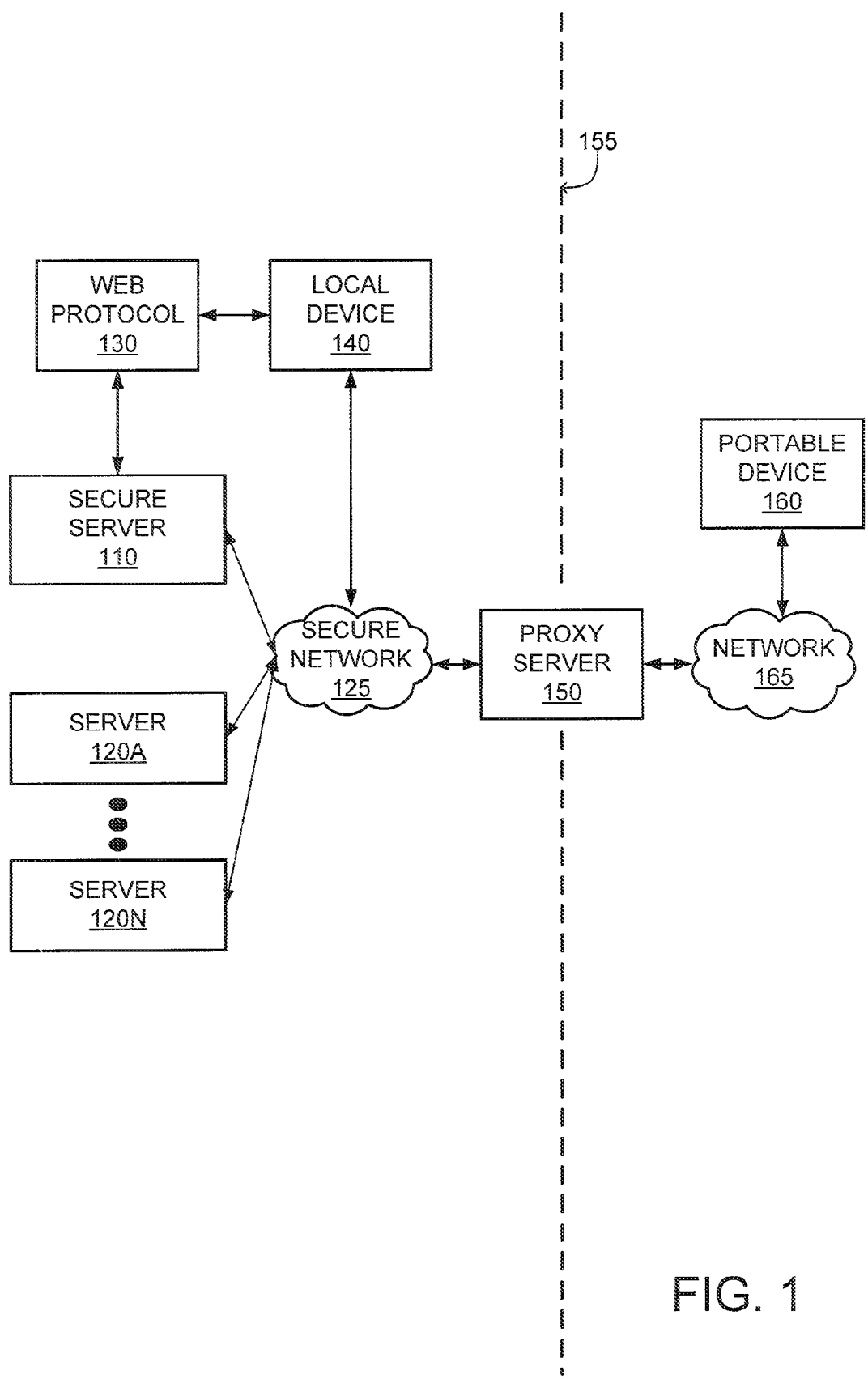
FIG. 1 is a block diagram of a secure communication system according to one embodiment of the invention.

FIG. 1 is a block diagram of a system architecture according to one embodiment. As shown in FIG. 1, a secure server 110 and various other servers 120A-120N communicate data between themselves and to one or more local devices 140 using a secure network 125. The secure server 110 uses a certificate provisioning or shared secret process to identify devices, such as local device 140 or portable device 160, which are permitted to access the secure network 125. For example, the secure server 110 includes a certificate that must be stored, along with an associated private key, by any device able to access the secure network 125. Alternatively, the secure server 110 provides a shared secret to each device able to access the secure network 125, so that the device uses its associated shared secret to access the secure network 125. To communicate a certificate or shared secret to a device, such as local device 140 or portable device 160, the secure server 110 communicates an initial key to the device, which uses the initial key to securely communicate with the secure server 110. Hence, the secure server 110 communicates an initial key, such as a shared secret, to a device such as local device 140 or portable device 160, which attempts to transmit or receive data using the secure network 125. Alternatively, certificate included on the secure server 110 is used to generate trusted certificates which are associated with each device accessing the secure network 125. Each certificate is digitally signed by the secure server 110 so that each certificate is cryptographically secure.

To communicate a trusted certificate to a device able to access the secure network 125, the secure server 110 establishes a secure communication channel with the device and uses the secure communication channel to communicate the certificate or trusted certificate to the device. For example, the secure server 110 generates the initial key that is used to encrypt the communication channel between the secure server 110 and the device. Alternatively, the secure server 110 generates a shared secret, which is used as the initial key to encrypt communication between the secure server 110 and the device as well as used for subsequent communication between the secure server 110 and the device. Hence, in various embodiments, the initial key can be used to communicate a certificate which is used for subsequent communication between the secure server 110 and the device or the initial key can be used to encrypt multiple subsequent communications between the secure server 110 and the device.

By encrypting the communication channel, data, such as a trusted certificate, can be communicated from the secure server 110 to the device without being accessed by another device, preventing unauthorized devices from accessing the secure network 125. Hence, the secure server 110 regulates which devices are able to transmit and retrieve data using the secure network 125, which may comprise any combination of local are and/or wide area networks, using wired and/or wireless communication systems. For example, the secure network 125 may comprise the Internet, a local area network (LAN), a wide area network (WAN), a private network, a virtual private network or another type of wired or wireless network.

Servers 120A-120N provide various services to local devices 140 connected to the secure network 125. For example, servers 120A-120N may include a mail server, a web server, a calendar server, a database server or other type of server providing functionality to one or more local devices 140 through the secure network 125. For purposes of illustration, FIG. 1 shows a single local device 140, although any number of local devices 140 may be connected to the secure network 125.

A local device 140 is a device having computing functionality and data communication capabilities. The local device 140 presents data to a user using one or more output methods, such as visually displaying data using a display device or aurally presenting data using a speaker, earphones or other audio playback devices. Additionally, the local device 140 receives user input through a keyboard, a touch screen, a mouse, a trackball, a microphone or other suitable input device. In one embodiment, the local device 140 is a device having a secure connection, such as a virtual private network (VPN) connection, to the secure network 125. This allows the local device 140 to reside outside of the firewall 155 while able to communicate with the secure server 110 through the secure network 125.

In one embodiment, the secure server 110 communicates with the local device 140 using a web protocol 130, such as the hypertext transfer protocol (HTTP). The local device 140 executes a browser, or other method for accessing the secure network 125 or the secure server 110, which allows the local device 140 to locally present data received via the web protocol 130 using a web interface. The web protocol 130 allows the secure server 110 to communicate data to the local device 140 or to receive data from the local device 140. The web interface of the local device 140 allows a user of the local device 140 to enter data for communication to the secure server 110 or to view or otherwise access data from the secure server 110. For example, the web interface is a web page where a user of the local device 140 enters account information, such as a username and/or password. The web protocol 130 then communicates this information to the secure server 110 for authentication, and receives data from the secure server 110 indicating results of the authentication. The local device 140 includes a trusted certificate or shared secret allowing communication with the secure network 125 and secure server 110.

A firewall 155 limits access to the secure network 125 and the servers 120A-120N, secure server 110, local device 140 and other devices coupled to the secure network 125. The firewall 155 receives data from various devices, inspects the data and denies or permits the data to pass through the firewall based on one or more rules. Hence, the firewall 155 regulates the flow of data between the secure network 125 and the network 165. For example, the firewall 155 limits data communication between an internal network, such as a corporate network, including the servers 120A-120N, the secure network 125, the secure server 110 and one or more local devices 140, and an external network 165, such as the Internet.

In one embodiment, a proxy server 150 is coupled to the firewall 155. Alternatively, the firewall 155 is included in the proxy server 150. The proxy server 150 communicates data between a server 120A-120N and a portable device 160 using the secure network 125 and the network 165. The proxy server 150 receives data requests from the portable device 160 via the network 165 and connects to a server 120A-120N using the secure network 125 and requests the data from a server 120A-120N on behalf of the portable device 160. However, the proxy server 150 and/or the firewall 155 does not communicate data between a sever 120A-120N to the portable device 160 unless the secure server 110 has previously granted the portable device 160 access to the secure network 125. Hence, the proxy server 150 and/or firewall 155 limits data transmission to portable devices 160 that have been provisioned to access the secure network 125.

A portable device 160, such as a Smartphone, a personal digital assistant (PDA) or other mobile device having computing functionality and data communication capabilities, connects to the proxy server 150 via a network 165, which may comprise any combination of local are and/or wide area networks, using wired and/or wireless communication systems. For example, the network 165 may comprise the Internet, a local area network (LAN), a wide area network (WAN), a private network, a virtual private network or another type of wired or wireless network. For purposes of illustration, FIG. 1 depicts a single portable device 160, although multiple portable devices 160 can be connected to the proxy server 150 at any time.

Figure 2:
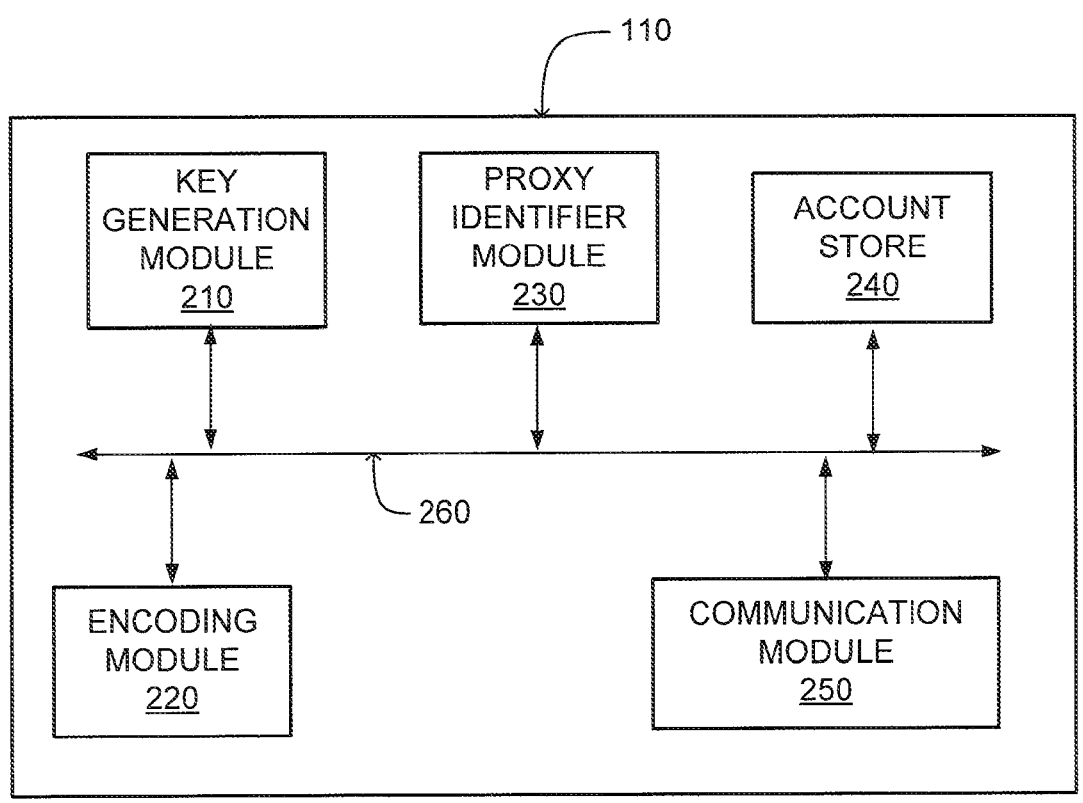
FIG. 2 is a block diagram of a secure server for provisioning a portable device using a representation of a security key according to one embodiment of the invention.

FIG. 2 is a block diagram of a secure server 110 for provisioning a portable device using a representation of a key according to one embodiment. To more clearly illustrate the features of the system, FIG. 2 does not show conventional features, such as a processor, a memory, a storage device and so forth. The secure server 110 comprises a key generation module 210, an encoding module 220, a proxy identifier 230, an account store 240 and a communication module 250 coupled by a bus 260.

The key generation module 210 generates a key used to encrypt a communication channel between the secure server 110 and a portable device 160. The key generation module 210 comprises computer executable instructions that, when executed by a processor (not shown) on the secure server 110 generate a fixed-size string. In one embodiment, the fixed-size string is a random or pseudo-random string of alphanumeric characters and/or other symbols, such as punctuation marks or editing symbols or abbreviations. For example, the key generation module 210 applies a cryptographic hash function, such as Message Digest algorithm 5 (MD-5) or secure hash algorithm (SHA), to an input value to generate the fixed string used as the key.

However, to encrypt the communication channel, both the secure server 110 and portable device 160 locally store the key in order to securely encrypt the communication channel. Hence, the secure server 110 needs to first communicate the key to the portable device 160 for local storage before secure communications are possible. To communicate the key to the portable device 160, the encoding module 220 receives the key as an input and generates a representation of the key as output. The encoding module 220 may also receive additional input, such as a proxy identifier indicating the address of the proxy server 150 and/or account information associated with the user requesting access to the secure server, such as a username and password. This allows the representation of the key to include additional data used for establishing communication between secure server 110 and portable device 160.

In one embodiment, the encoding module 220 applies a matrix code generation algorithm, such as a Quick Response ("QR") code generation algorithm, to the key generated by the key generation module 210 to generate a two-dimensional barcode visually describing the key. Alternatively, the encoding module 220 applies an audio encoding algorithm to generate an audio file based on the generated key. The representation of the key is then communicated from the secure server 110 to a local device 140 for retrieval by the portable device 160. Hence, the portable device 160 is able to obtain the key without directly accessing or communicating with the secure server 110.

While conventional methods require users to manually enter the generated key into a portable device 160 or to physically connect the portable device 160 to the secure server 110 to store the key, the encoding module 220 simplifies storage of the generated key by the portable device 160. Rather than requiring a physical connection to the secure server 110 or manual entry of the key, the portable device is able to obtain the key by capturing the representation of the key and subsequently extracting the key from the representation of the key. As the key cannot be determined without decoding the representation of the key, this communication of the key to the portable device preserves the key's security. Additionally, generating the representation of the key allows the key length to be increased, further increasing security. As the key is not manually entered, the key length can be increased without requiring a user to manually enter more information.

The proxy identifier 230 comprises a storage device, or a partition of a storage device, including an internet protocol (IP) address or other data specifying the network address of the proxy server 150. Similarly, the account store 240 is also a storage device, or a portion of a storage device, including a database including account information for users having access to the secure server. For example, the account store 240 includes a database of usernames and passwords associated with the usernames.

Although shown in FIG. 2 as discrete modules, in another embodiment the proxy identifier 230 and the account store 240 may be implemented as a single module. Alternatively, the proxy identifier 230 and account store 240 may comprise partitions of a single storage module.

The communication module 250 links the secure server 110 to the secure network 125, or to one or more local devices 140 and/or severs 120A-N. The communication module 250 is a network interface which supports a networking protocol stack, such as the Open Systems Interconnection Basic Reference Model (OSI Model). Hence, the communication module 250 allows the secure server 110 to communicate with the secure network 125 using wireless and/or wired communication methods.

Figure 3:
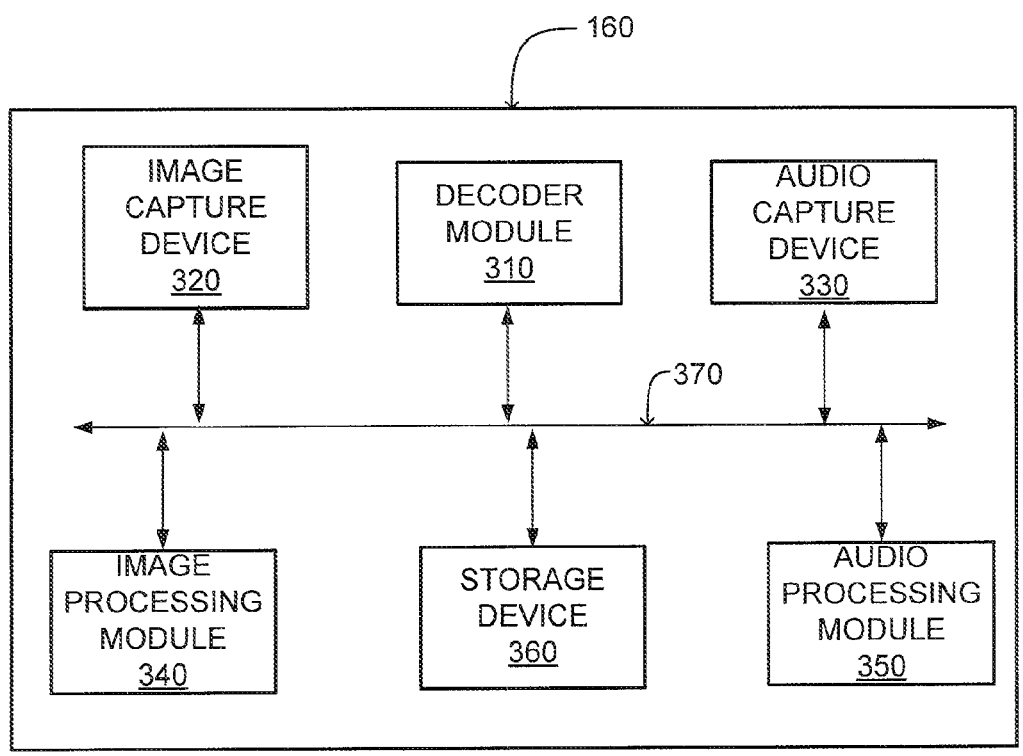
FIG. 3 is a block diagram of a portable device for using a representation of a security key according to one embodiment of the invention.

FIG. 3 is a block diagram of a portable device 160 which uses a representation of a key to establish a communication channel the secure server 110 according to one embodiment. To more clearly illustrate the features of the portable device 160, FIG. 3 does not show conventional features, such as a processor, a display device, a transceiver, a random access memory and the like. The portable device 160 includes a decoder module 310, an image capture device 320, an audio capture device 330, an image processing module 340, an audio processing module 350 and a storage device 360 coupled by a bus 370.

The decoder module 310 includes instructions that when executed by a processor extract the key from the representation of the key. For example, the decoder module 310 includes instructions for a process to convert a two-dimensional barcode into fixed length string. As another example, the decoder module 310 includes instructions for converting audio data into a fixed length string. In one embodiment, the decoder module 310 also includes instructions for partitioning the representation of the key into different data fields, such as the key, a network address associated with the proxy server 150, user account information or other data included in the representation of the key.

The portable device 160 includes components for capturing data, such as an image capture device 320 and an audio capture device 330. The image capture device 320 comprises sufficient optics and sensors for capturing image data. For example, the image capture device 320 is a camera or video recorder. The audio capture device 330 records audio using one or more microphones.

In an embodiment, the image capture device 320 is coupled to an image processing module 340 via bus 370. The image processing module 340 includes instructions that when executed by a processor (not shown) apply one or more image enhancement methods to the image data captured by the image capture device 320. For example, the image processing module 340 includes instructions describing methods for detecting edges in the captured image data, filtering captured image data, normalizing brightness and increasing contrast within the captured image data or other image enhancement methods to remove noise or enhance a subset of the captured image data. Processing captured image data allows the representation of the key to be more easily identified from the image data.

In one embodiment, audio capture device 330 is coupled to an audio processing module 350 via bus 370. The audio processing module 350 includes instructions that when executed by a processor (not shown) apply one or more audio enhancement methods to the recorded audio. For example, the audio processing module 350 includes instructions describing methods for isolating a range of frequencies in the recorded audio, removing specific frequencies in the recorded audio, amplifying specific frequencies in the recorded audio or other methods that enhance a subset of the recorded audio.

The storage device 360 receives data from the bus 370 and stores the data for subsequent use by the portable device 160. In various embodiments, the storage device 360 comprises a hard disk drive, a flash memory device or other suitable non-volatile storage device. Alternatively, the storage device 360 is a volatile storage device (e.g., dynamic random access memory (DRAM), static random access memory (SRAM) or another suitable memory device) or a combination of a non-volatile storage device and a volatile storage device. Although described above as discrete components, in another embodiment the storage device 360 includes the decoder module 310, the image processing module 340 and/or the audio processing module 350, allowing the storage device 360 to perform the functions of one or more of the decoder module 310, the image processing module 340 and/or the audio processing module 350.

System Operation

Figure 4:
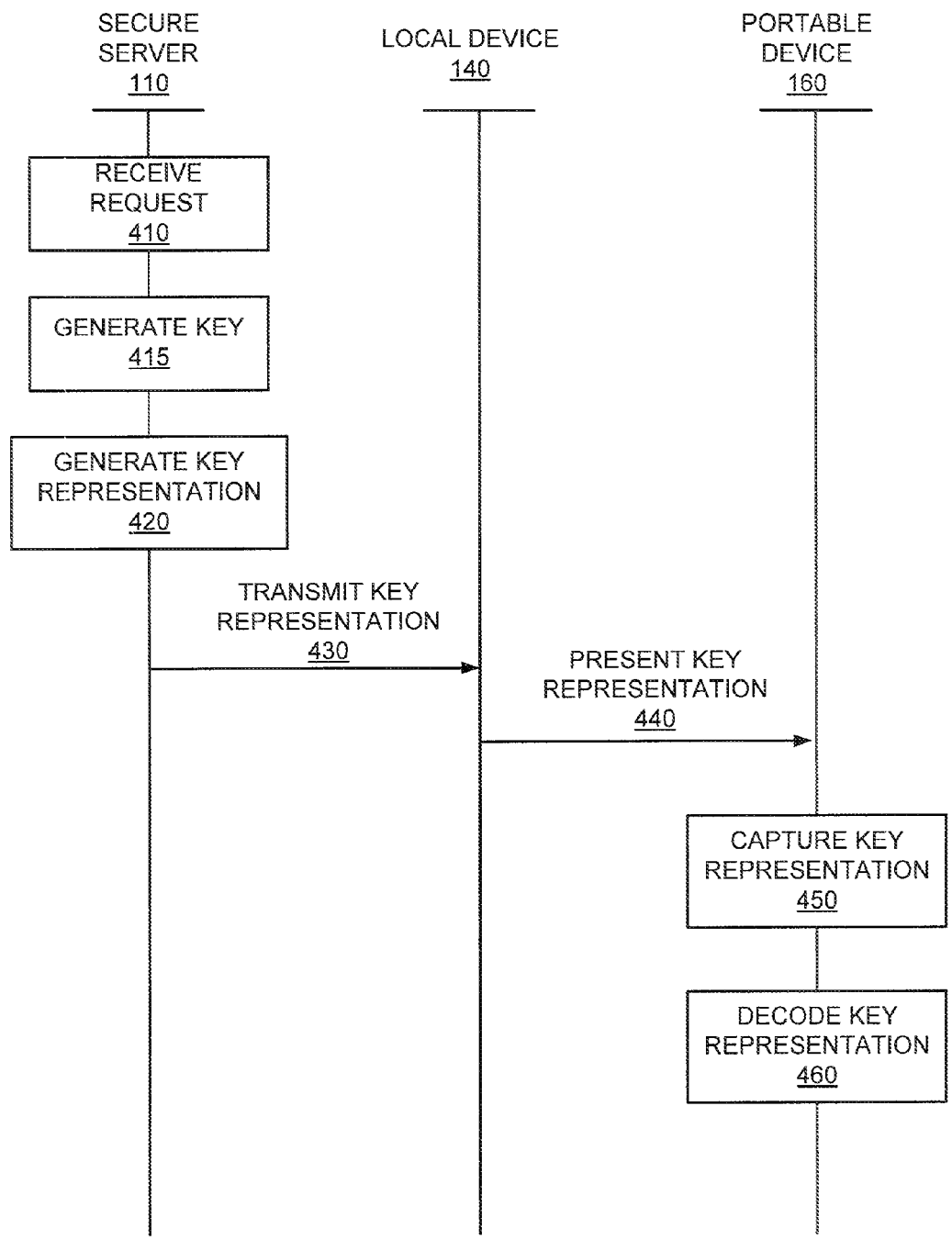
FIG. 4 is an event diagram of a method for provisioning a portable device using a representation of a security key according to one embodiment of the invention.

FIG. 4 is an event diagram of a method for provisioning a portable device using a representation of a security key according to one embodiment of the invention. The actions described in FIG. 4 can be implemented by various computer systems executing instructions that cause the described actions. Those of skill in the art will recognize that one or more of the actions may be implemented in embodiments of hardware and/or software or combinations thereof. For example, instructions for performing the described actions are embodied or stored within a computer readable storage medium. Other embodiments can include different and/or additional steps than the ones described here.

Upon receiving 410 a request for a user to access the secure network 125, the secure server 110 generates 415 an initial key. The key is used to establish a secure communication channel between the secure server 110 and the portable device 160. In one embodiment, the key is used to establish a secure communication channel used to transmit a trusted certificate from the secure server 110 to the portable device 160, allowing use of the trusted certificate to secure subsequent communication between the secure server 110 and the portable device 160. Alternatively, the key is a shared secret that is associated with the portable device 160 and which is used for secure communication between the secure server 110 and the portable device 160. Receiving and locally storing the key allows the portable device 160 to access the secure network 125 and to obtain a trusted certificate from the secure server 110 if necessary. In one embodiment, the key is a fixed length string, such as a string including numeric characters, alphanumeric characters or other symbols, such as punctuation marks, editing symbols or abbreviations. For example, a key generation module 210 included in the secure server 110 applies a cryptographic hash function to the request for user access to generate the key. In one embodiment, the key is valid for a predefined time interval or can only be used one time to establish a secure communication channel.

The secure server 110 uses the key to generate 420 a representation of the key. To generate 420 the representation of the key, the fixed length string is converted into a format that can be readily captured by the portable device 160 without directly communicating the fixed length string to the portable device. In one embodiment, the representation of the key is an image, such as a two-dimensional barcode, with data describing the key embedded within the image. For example, the encoding module 220 of the secure server 110 applies an encoding algorithm to the key to generate a two-dimensional barcode, such as a QR code, that includes the key. Alternatively, the encoding module 220 of the secure server 110 applies an audio encoding algorithm to the key to generate an audio file including the key. In one embodiment, the representation of the key includes data in addition to the key, such as a network address associated with the proxy server 150 or user account information, such as a username and password.

The representation of the key is transmitted 430 via the secure network 125 to a local device 140 which presents 440 the representation of the key to the requesting user. The local device 140 has previously been provisioned to access the secure network 125. Transmitting 430 the representation of the key to the local device 140 allows the portable device 160 to obtain the representation of the key without directly accessing the secure server 110, allowing the portable device 160 to be configured from a remote location. In one embodiment, the local device 140 is a device having a secure connection, such as a VPN connection, to the secure network 125. This allows the representation of the key to be accessed from locations outside of the firewall 155, increasing the locations from which the portable 160 device can be provisioned.

For example, a user may use a public terminal to establish a VPN connection to the secure network 125 and receive the representation of the key at the public terminal using the VPN connection. This allows a user to provision a device using any terminal which can establish a secure connection with the secure network 125. Hence, a user may provision a new portable device 160 for access to a corporate server using any public terminal capable of establishing a secure connection with a secured corporate network rather than require the user to access a corporate computer to provision the new portable device 160. Additionally, transmitting the representation of the key to a local device 140 also limits access to the secure server 110 by allowing the portable device 160 to obtain data for establishing a secure network without accessing the secure server 110.

Depending on the format used for the representation of the key, the local device 140 presents 440 the representation of the key to the portable device in various ways. If the representation of the key is an image, the image is displayed by the local device 140. For example, the local device 140 uses a display device to visually present a two-dimensional barcode including the key and/or additional configuration data. As another example, the local device 140 uses an audio playback device to aurally present an audio file including the key and/or additional configuration data.

The portable device 160 then captures 450 the representation of the key presented 440 by the local device 140. In one embodiment, the portable device 160 receives a user input to capture 450 the representation of the key, such as a command to communicate with the secure server 110, causing the portable device to enter a configuration mode or execute a configuration command. For example, the configuration command or configuration mode causes an image capture device 320 of the portable device 160 to capture an image, such as a photograph, of the representation of the key presented 440 by the local device. As another example, the configuration command or configuration mode causes an audio capture device 330 of the portable device 160 to record audio played by the local device.

After capturing 450 the representation of the key, the portable device 160 decodes 460 the representation of the key to extract the key and any additional configuration information included in the representation of the key. The decoder module 310 of the portable device 160 applies one or more decoding algorithms to extract the key and any additional configuration information from the representation of the key. In one embodiment, one or more enhancement or filtering processes are applied to the captured representation of the key to improve accuracy of the decoding 460. For example, an image processing module 340 applies a filtering, smoothing, contrast enhancement or other image processing algorithm to a captured image representation of the key to improve the quality of the captured image. Similarly, an audio processing module applies one or more filtering, sharpening or other audio processing algorithm to captured audio representation of the key. The enhanced or filtered representation of the key is then decoded 460 to accurately identify the key.

The key and any configuration information is then stored by the portable device 160 in a storage device 360 and used to encrypt a communication channel between the portable device 160 and the secure server 110. This encrypted communication channel is used by the secure server 110 to securely communicate data, such as a trusted certificate, to the portable device 160. In an embodiment, the portable device 160 stores the key in the storage device 360 and uses the key to encrypt subsequent commutation with the secure server. In another embodiment, the portable device 160 uses the key to establish a secure communication channel with the secure server 110 and receive a trusted certificate from the secure server 110. The portable device 160 then stores the trusted certificate in the storage device 360 and uses the trusted certificate to subsequently access the secure network 125 through the proxy server 150.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Upon reading this disclosure, those of skill in the art will appreciate still additional alternative structural and functional designs for a system and a process for establishing a secure connection between a portable device and a secure server using a representation of a key used for encrypting the connection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

We claim:

1. A system for provisioning devices for secure communication comprising:
   a secure server behind a firewall configured to:
   receive a request from a user of a portable device outside of the firewall to provision the portable device for communication with the secure server;
   generate a key associated with the user, the key configured to allow the portable device to communicate with the secure server via a proxy server, the proxy server configured to communicate data from the portable device through the firewall to the secure server and to forward data from the secure server through the firewall to the portable device responsive to the possession of the key by the portable device; and
   generate a representation of the key; and
   provide the representation of the key to a local device previously provisioned to communicate with the secure server and configured to provide the representation of the key to the portable device.

2. The system of claim 1, wherein generating the representation of the key comprises:
   encoding the key into an audio file.

3. The system of claim 1, wherein generating the representation of the key comprises:
   determining a network identifier identifying the proxy server;
   determining account information identifying the user; and
   encoding the network identifier, the account information and the key into an image, the image comprising the representation of the key.

4. The system of claim 1, wherein the key comprises a fixed-length string.

5. The system of claim 4, wherein the fixed-length string includes alphanumeric characters, numeric characters or symbols.

6. The system of claim 1, wherein generating the representation of the key based on the generated key comprises:
   encoding the key into an image.

7. The system of claim 6, wherein the image comprises a two-dimensional barcode.

8. A method for provisioning a portable device for communication, the method comprising:
   receiving, at a secure server behind a firewall, a request from a user to provision the portable device;
   generating a key associated with the user, the key configured to allow the portable device to communicate with the secure server via a proxy server, the proxy server configured to communicate data from the portable device through the firewall to the secure server and to forward data from the secure server through the firewall to the portable device responsive to the possession of the key by the portable device;
   generating a representation of the key; and
   providing the representation of the key to a local device, the local device provisioned for communication with the secure server and configured to provide the representation of the key to the portable device.

9. The method of claim 8, wherein generating the representation of the key based on the generated key comprises:
   encoding the key into an audio file.

10. The method of claim 8, wherein generating the representation of the key based on the generated key comprises:

determining a network identifier identifying the proxy server;

determining account information identifying the user; and encoding the network identifier, the account information and the key into an image, the image comprising the representation of the key.

11. The method of claim 8, wherein the key comprises a fixed-length string.

12. The method of claim 11, wherein the fixed-length string includes alphanumeric characters, numeric characters or symbols.

13. The method of claim 8, wherein generating the representation of the key based on the generated key comprises:

encoding the key into an image.

14. The method of claim 13, wherein the image comprises a two-dimensional barcode.

15. A non-transitory computer-readable storage medium containing executable computer instructions for provisioning a portable device for communication, the instructions comprising instructions for:

capturing a representation of a key with a portable device from a local device, the local device previously provisioned for communication with a secure server behind a firewall, the representation of a key representing a key configured to allow the portable device to communicate with the secure server via a proxy server, the proxy server configured to communicate data from the portable device through the firewall to the secure server and to forward data from the secure server through the firewall to the portable device responsive to the possession of the key by the portable device;

decoding the representation of the key to extract the key;

storing the extracted key; and establishing a connection to the secure server via the proxy server using the extracted key.

16. The computer-readable storage medium of claim 15, wherein capturing the representation of the key from the local device comprises:

capturing image data from the local device, the image data associated with the representation of the key.

17. The computer-readable storage medium of claim 16, wherein decoding the representation of the key comprises:

enhancing the captured image data to generate enhanced imaged data; and extracting the key from the enhanced image data.

18. The computer-readable storage medium of claim 16, wherein the captured image data comprises a two-dimensional barcode.

19. The computer-readable storage medium of claim 15, wherein capturing the representation of the key from the local device comprises:

recording audio data from the local device, the audio data associated with the representation of the key.

20. The computer-readable storage medium of claim 19, wherein decoding the representation of the key comprises:

enhancing the captured audio data to generate enhanced audio data; and extracting the key from the enhanced audio data.

21. A non-transitory computer-readable storage medium containing executable computer instructions for provisioning a portable device for communication, the instructions comprising instructions for:

receiving, at a secure server behind a firewall, a request from a user to provision the portable device;

generating a key associated with the user, the key comprising a fixed-length alphanumeric string configured to allow the portable device to communicate with the secure server via a proxy server, the proxy server configured to communicate data from the portable device through the firewall to the secure server and to forward data from the secure server through the firewall to the portable device responsive to the possession of the key by the portable device;

generating a representation of the key, the representation of the key comprising a two-dimensional barcode including the key, a network identifier identifying the proxy server and account information identifying the user; and providing the representation of the key to a local device in communication with the portable device, the local device previously provisioned for communication with the secure server and configured to provide the representation of the key to the portable device.

* * * * *